(12) United States Patent
Chen et al.

(10) Patent No.: US 8,125,565 B2
(45) Date of Patent: Feb. 28, 2012

(54) IMAGE PROCESSING CIRCUIT AND METHOD THEREOF

(75) Inventors: Chung-Yi Chen, Hsinchu Hsien (TW); Li-Huan Jen, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 616 days.

(21) Appl. No.: 12/339,909

(22) Filed: Dec. 19, 2008

(65) Prior Publication Data

US 2009/0174814 A1    Jul. 9, 2009

(30) Foreign Application Priority Data

Jan. 4, 2008 (TW) ............................ 97100389 A
Jul. 2, 2008 (TW) ............................ 97124951 A

(51) Int. Cl.
*H04N 7/01* (2006.01)

(52) U.S. Cl. ...................................... 348/452; 348/448

(58) Field of Classification Search .................. 348/448, 348/451, 452, 458, 459; *H04N 7/01, 11/20*
See application file for complete search history.

(56) References Cited

U.S. PATENT DOCUMENTS

| 6,992,725 | B2 | 1/2006 | Mohsenian | |
|---|---|---|---|---|
| 7,738,037 | B2 * | 6/2010 | Tang et al. | 348/448 |
| 2008/0055466 | A1 * | 3/2008 | Garg et al. | 348/452 |

OTHER PUBLICATIONS

State Intellectual Property Office of the People Republic of China, "Office Action", Apr. 29, 2010, China.

* cited by examiner

*Primary Examiner* — Sherrie Hsia

(74) *Attorney, Agent, or Firm* — WPAT, PC; Justin King

(57) ABSTRACT

An image processing circuit generating a frame according to a plurality of fields including at least first, second and third fields, comprises a memory unit and a de-interlacing unit. The memory unit stores the first and second fields. The de-interlacing unit receives the third field, and reads the first and second fields from the memory to generate a de-interlaced frame accordingly.

26 Claims, 10 Drawing Sheets and next previous field fi_p-2. The de-interlacing unit 114 generates a frame fr according to the current and previous fields fi_p and fi_p-1, or the previous and next previous fields fi_p-1 and fi_p-2 provided by the memory unit 112. The motion interpolation module 120 comprises a memory unit 122, a motion estimation unit 124, and a motion compensation unit 126. The memory unit 122 stores current and previous frames fr_p and fr_p-1 of the frames fr. The motion estimation module 124 performs algorithm on the current and previous frames fr_p and fr_p-1 to obtain a motion vector MV. The motion compensation unit 126 performs interpolation according to the motion vectors, and current and previous frames fr_p and fr_p-1 to obtain an interpolation frame fr_in.

IMAGE PROCESSING CIRCUIT AND METHOD THEREOF

FIELD OF THE INVENTION

The present invention relates to an image processing circuit, and more particularly, to an image processing circuit for de-interlacing and interpolating image data.

BACKGROUND OF THE INVENTION

Video data like television video is generally transmitted using interlaced fields; that is, each frame is divided into an odd field and an even field. During transmission, a transmitting end only transmits the odd field of the de-interlaced frame and the even field of the interpolated frame to a receiving end. Using interlaced transmission, the transmission data amount is reduced by one half at any given time point. However, video data received at the receiving end is an even field or an odd field but not a complete frame. De-interlacing is used to process these sequent odd and even fields to generate a complete frame to be displayed on a display.

An example shall be given with reference of FIG. 1 showing a block diagram of a conventional image processing circuit at an image receiving end. An image processing circuit 10 comprises a de-interlacing module 110 and a motion interpolation module 120. The image processing circuit 10 comprises a memory unit 112 and a de-interlacing unit 114. The memory unit 112 receives and stores fields fi including a current field fi_p, a previous field fi_p-1, and next previous field fi_p-2. The de-interlacing unit 114 generates a frame fr according to the current and previous fields fi_p and fi_p-1, or the previous and next previous fields fi_p-1 and fi_p-2 provided by the memory unit 112. The motion interpolation module 120 comprises a memory unit 122, a motion estimation unit 124, and a motion compensation unit 126. The memory unit 122 stores current and previous frames fr_p and fr_p-1 of the frames fr. The motion estimation module 124 performs algorithm on the current and previous frames fr_p and fr_p-1 to obtain a motion vector MV. The motion compensation unit 126 performs interpolation according to the motion vectors, and current and previous frames fr_p and fr_p-1 to obtain an interpolation frame fr_in.

The foregoing memory unit 112 and a memory unit 122 may not be included in the image processing circuit 10. The fields and the frames may be stored in a dynamic random access memory (DRAM), which is coupled to the image processing circuit 10. When the de-interlacing module 110 performs de-interlacing or when the motion interpolation module 120 performs motion interpolation, the fields are read from the DRAM.

However, in the conventional image processing circuit 10, to store respectively data used for de-interlacing and motion interpolation, it is necessary that the memory units 112 and 122 have at least memory capacities for storing three fields and two frames. As a result, the conventional image processing circuit 10 has a drawback of high memory costs due to large memory capacities and bandwidths required.

SUMMARY OF THE INVENTION

Therefore, the present invention provides an image processing circuit, which has advantages of having a smaller memory capacity with reduced processing time and lower memory costs compared to those of conventional image processing circuits.

The present invention provides an image processing circuit for generating a output frame according to a plurality of fields including at least a first field, a second field, and a third field in time sequence. The image processing circuit comprises a memory unit for storing the first field and the second field; a de-interlacing unit for receiving the third field and reading the first field and the second field from the memory unit to generate a de-interlaced frame; a motion interpolation unit for generating a interpolated frame according to the first field, the second field, and the third field; and a frame processing unit for generating the output frame according to the de-interlaced frame and the interpolated frame.

The present invention provides an image processing circuit for generating a output frame according to a plurality of fields including at least a first field, a second field, and a third field in time sequence. The image processing circuit comprises a memory unit for storing the first field and the second field; a de-interlacing unit for receiving the third field and reading the first field and the second field from the memory unit to generate a de-interlaced frame; a motion interpolation unit for generating a interpolated frame according to the first field, the third field and the de-interlaced frame; and a frame processing unit for generating the output frame according to the de-interlaced frame and the interpolated frame.

The present invention provides an image processing circuit for generating a frame according to a plurality of fields including at least a first field, a second field, and a third field in time sequence. The image processing circuit comprises a memory unit for storing at the first field and the second field; and a de-interlacing unit for receiving the third field and reading the first field and the second field from the memory unit to generate a frame; wherein the memory unit having the same clock rate for reading and writing.

The present invention provides an image processing circuit for generating a output frame according to a plurality of fields. The image processing circuit comprises a memory unit for storing at least three fields including the first field, the second field, and the third field in time sequence; a de-interlacing unit for generating a de-interlaced frame according to the first field, the second field, and the third field; a motion interpolation unit for generating a interpolated frame according the first field, the second field, and the third field; and a frame processing unit for generating the output frame according to the de-interlaced and the interpolated frame.

The present invention provides an image processing circuit for generating a frame according to a plurality of fields. The image processing circuit comprises a memory unit for storing at lease three fields including the first field, the second field, and the third field in time sequence; a de-interlacing unit for generating a de-interlaced frame according to the first field, the second field, and the third field; a motion interpolation unit for generating a interpolated frame according to the de-interlaced frame, the first field, and the third field; and a frame processing unit for generating the output frame according to the de-interlaced and the interpolated frame.

The present invention provides an image processing method for generating a output frame according to a plurality of fields including at least the first field, the second field, and the third field in time sequence, wherein the first field and the second field are stored in a memory. The method comprises steps of: receiving the third field and reading the first field and the second field from the memory; selecting one of the first field and the third field to be a selected field; de-interlacing to generate a de-interlaced frame according to the second field and the selected field; performing motion interpolation to generate an interpolated frame according to the first field, the second field, and the third field; and generating the output frame according to the de-interlaced frame and the interpolated frame interpolated frames.

The present invention provides a de-interlacing circuit coupled to a memory and for generating a de-interlaced frame according to a plurality of fields at least including a first field, a second field, and a third field in time sequence, wherein the first field and the second field are stored in the memory. The de-interlacing circuit comprises a multiplexer for selecting one of the first field and the third field to be a selected field based on image contents; and an adaptive de-interlacing (ADi) circuit for generating the de-interlaced frame according to the second field and the selected field.

The present invention provides an image processing circuit coupled to a memory for generating an output frame according to a plurality of fields at least including a first field, a second field, and a third field in time sequence, wherein at least the first field and the second field are stored in the memory. The image processing circuit comprises a de-interlacing unit for generating a de-interlaced frame according to the first field, the second field, and the third field; a motion interpolation unit for generating a interpolated frame according to the first field, the second field, and the third field; and a frame processing unit for generating the output frame according to the de-interlaced frame and the interpolated frame.

The present invention provides an image processing circuit coupled to a memory for generating an output frame according to a plurality of fields at least including a first field, a second field, and a third field in time sequence, wherein at least the first field and the second field are stored in the memory. The image processing circuit comprises a de-interlacing unit for generating a de-interlaced frame according to the first field, the second field, and the third field; a motion interpolation unit for generating a interpolated frame according to the first field, the third field, and the de-interlaced frame; and a frame processing unit for generating the output frame according to the de-interlaced frame and the interpolated frame.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE PREFERRED EMBODIMENT

The invention provides an image processing circuit for generating a frame according to a plurality of fields. The image processing circuit comprises a receiving unit, a memory unit and a de-interlacing unit. The memory unit may not be included in the image processing circuit, but may be coupled to the image processing circuit to store the fields; that is, the image processing unit and the memory unit may not be in a single chip. The receiving unit receives the fields and the memory unit is coupled to the receiving unit for storing the fields only including two fields. The de-interlacing unit is coupled to the receiving unit and the memory unit, and receives the fields from the receiving unit and the memory unit to generate a de-interlaced frame. In the processing, the capacity of the memory unit is effectively reduced.

First Embodiment

Figure 1:
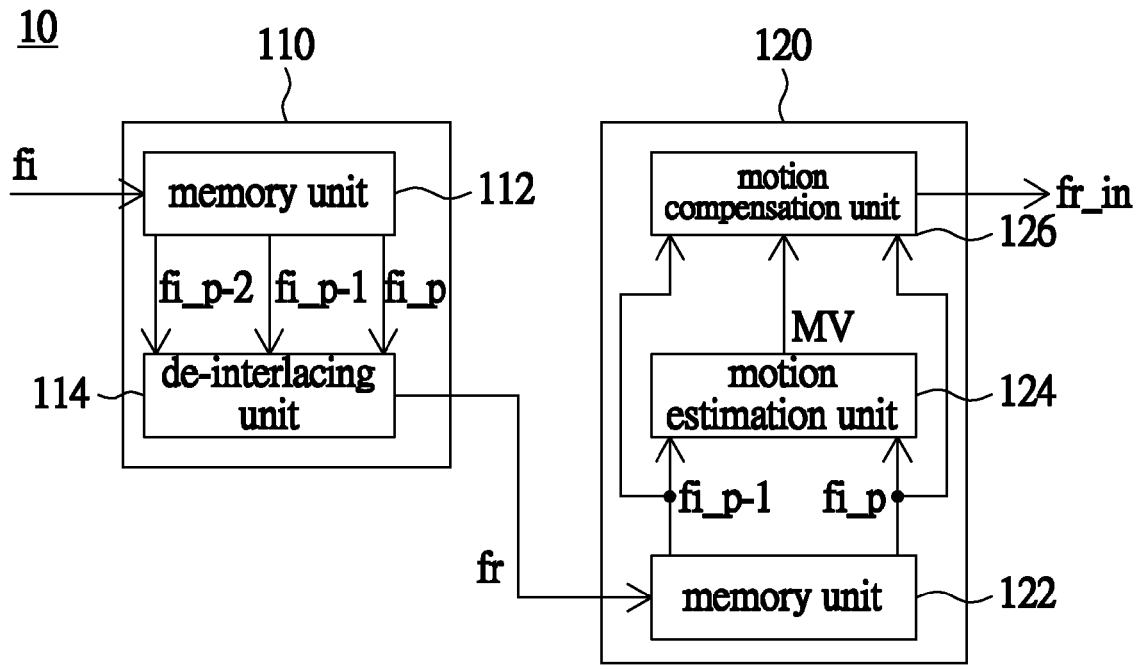
FIG. 1 is a block diagram of a conventional image processing circuit.
Figure 2:
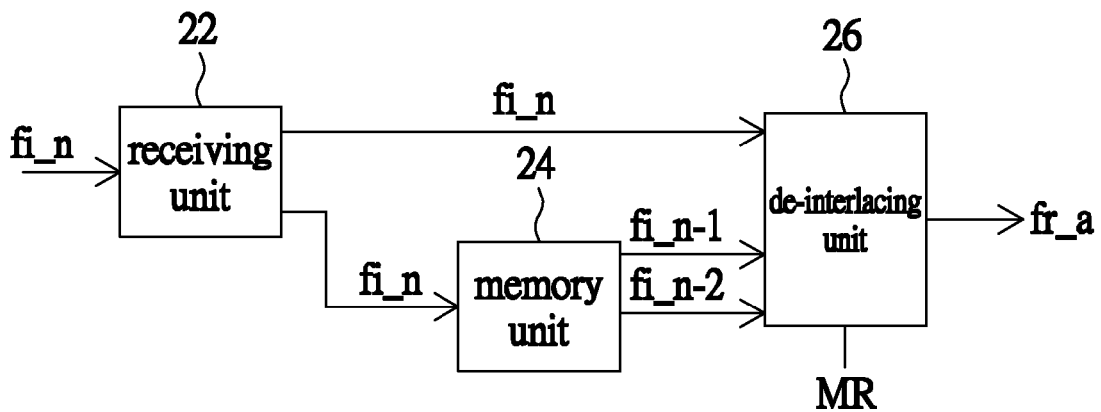
FIG. 2 is a block diagram of an image processing circuit according to a first embodiment of the invention.

The memory unit in this embodiment preferably stores two previous fields, and the image processing circuit performs de-interlacing according to two previous fields and a current field. The foregoing memory unit may be a field/frame buffer in an SRAM integrated in the image processing circuit, or may be in an external DRAM coupled to the image processing circuit. Referring to FIG. 2 showing a block diagram of an image processing circuit 20 according to a first embodiment of the invention, the image processing circuit 20 receives a plurality of fields, and generates a de-interlaced frame by performing de-interlacing according to the fields. The image processing circuit 20 comprises a receiving unit 22, a memory unit 24, and a de-interlacing unit 26. The receiving unit 22 receives a plurality of fields. The memory unit 24 is coupled to the receiving unit 22 for storing at least two fields. The de-interlacing unit 26 is coupled to the receiving unit 22 and the memory unit 24, receives or reads the fields from the memory unit 24, and receives fields from the receiving unit 22 to generate a de-interlaced frame accordingly. Wherein, the output image frame corresponds to the de-interlaced frame.

For example, within a current operation period, the receiving unit 22 receives a current field fi_n of an input image, and outputs the current field fi_n to the de-interlacing unit 26. The memory unit 24 stores a previous field fi_n-1 and a next previous field fi_n-2. The de-interlacing unit 26 receives the current field fi_n from the receiving unit 22 and reads the previous field fi_n-1 and the next previous field fi_n-2 from the memory unit 24 to generate a de-interlaced frame fr_a.

The aforesaid memory unit 24 may be a field/frame buffer in an SRAM integrated in the image processing circuit, but is not limited to be included in the image processing circuit. That is, the memory unit 24 may also be an external DRAM coupled to the image processing unit 20.

Figure 3:
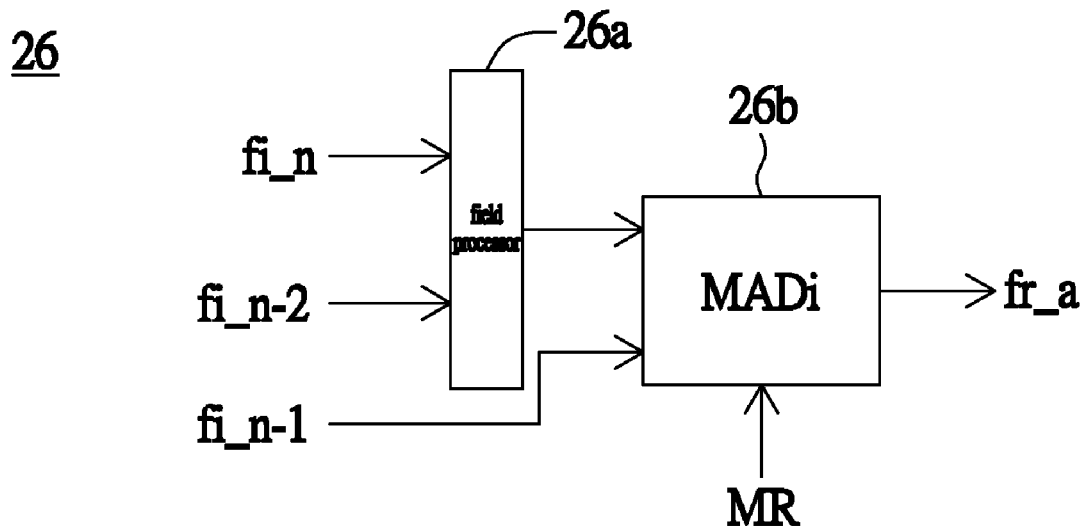
FIG. 3 is a detailed block diagram of the de-interlacing unit in FIG. 2.

Referring to FIG. 3 showing a detailed block diagram of the de-interlacing unit 26 in FIG. 2, the de-interlacing unit 26 according to this embodiment comprises a field processor 26a and a motion adaptive de-interlacing (MADi) circuit 26b. The field processor 26 is a multiplexer receiving the current field fi_n provided by the receiving unit 22, and the next previous field fi_n-2 provided by the memory unit 24. According to image contents such as image transmission format and correlation between preceding and following fields, the field processor 26a selects the current field fi_n or the next previous field fi_n-2, or a combination of the fi_n and fi_n-2 to output to the motion adaptive de-interlacing (MADi) circuit 26b. For instance, in a film mode, before selecting to output either the current field fi_n or the next previous field fi_n-2, it is first to be determined which of the current field fi_n and the next previous field fi_n-2 is generated by a same frame with the previous field fi_n-1. The MADi circuit 26b receives the selected field provided by the field processor 26a and the previous field fi_n-1 from the memory unit 24, and generates the de-interlaced frame fr_a accordingly.

Figure 4:
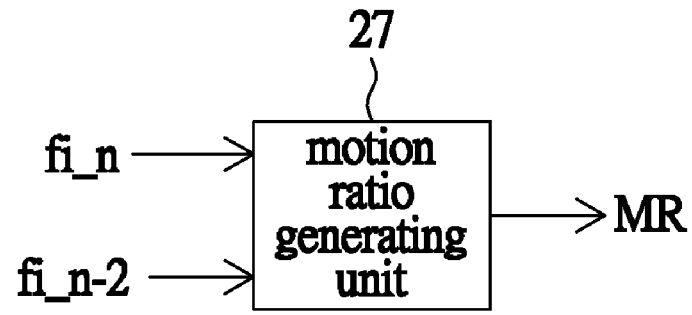
FIG. 4 is a block diagram of a motion ratio generating unit according to the first embodiment of the invention.

In this embodiment, although the MADi circuit 26b obtains a de-interlaced frame from a combination of corresponding fields as described, it is not limited that the MADi 26b obtains a frame solely by a combination of two corresponding fields. Referring to FIG. 4 showing a block diagram of a motion ratio generating unit according to the first embodiment of the invention, the MADi circuit 26b receives a motion ratio MR in response to image motion situations to generate the de-interlaced frame fr_a. To be more precise, the de-interlacing unit 26 comprises the motion ratio generating unit 27 for generating the motion ratio MR according correlation degrees of the current and the next previous fields fi_n and fi_n-2 with the previous field fi_n-1, respectively, wherein the motion ratio MR serves as basis on which the de-interlacing unit 26 selects either the current field fi_n or the next previous field fi_n-2 for generating the de-interlaced frame fr_a.

The memory unit in the image processing circuit according to the invention only need to store two previous fields, and the image processing circuits performs de-interlacing according to the two previous fields and the current field. Therefore, compared to conventional image processing circuits, the image processing circuit according to this embodiment requires a memory with a small capacity, lower transmission bandwidth and lower costs.

Second Embodiment

Figure 5:
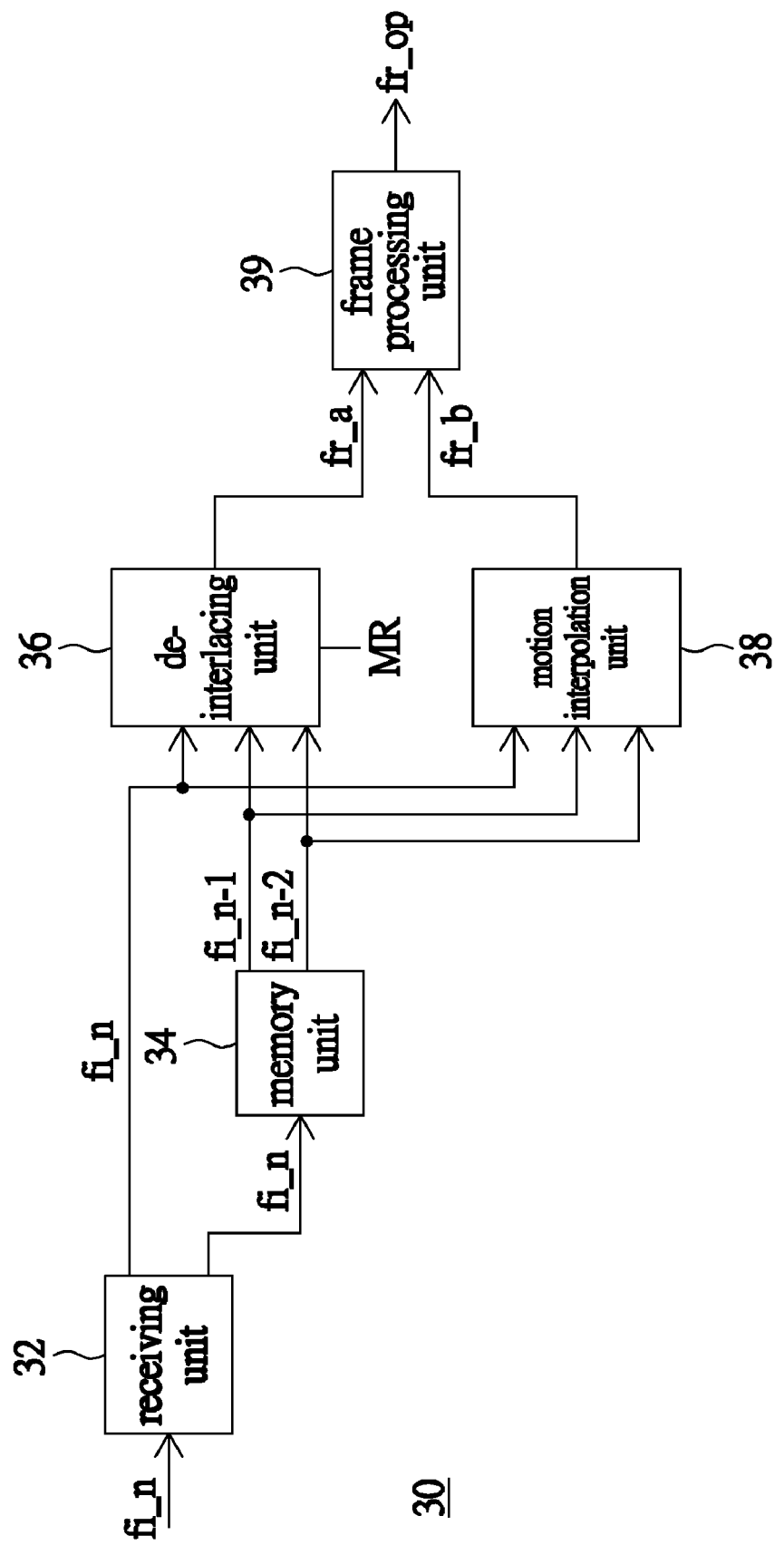
FIG. 5 is a block diagram of an image processing circuit according to a second embodiment of the invention.

A memory unit in an image processing circuit according to this embodiment stores two previous fields; and the image processing circuit performs de-interlacing and motion interpolation according to the two previous fields and a current field. Referring to FIG. 5 showing a block diagram of an image processing circuit according to the second embodiment of the invention, a difference between a image processing circuit 30 and the image processing circuit 20 according to the first embodiment is that, the image processing circuit 30 according to the second embodiment further comprises a motion interpolation unit 38 and a frame processing unit 39.

Figure 6:
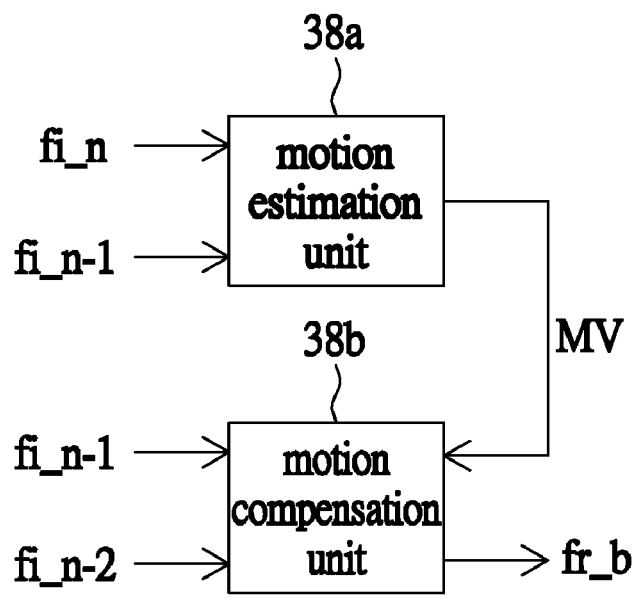
FIG. 6 is a detailed block diagram of the motion interpolation unit in FIG. 5.

The motion interpolation unit 38 is coupled to a receiving unit 32 and a memory unit 34, receives fields from the memory unit 34 and the receiving unit 32, and generates a frame fr_b accordingly. FIG. 6 is a detailed block diagram of the motion interpolation unit in FIG. 5. The motion interpolation unit 38 comprises a motion estimation unit 38a and a motion compensation unit 38b. According to the previous field fi_n-1 from the memory unit 34 and the current field fi_n from the receiving unit 32, the motion estimation unit 38a performs motion estimation and generates at least one motion vector MV, which is usually generated by block matching comparison.

Figure 7:
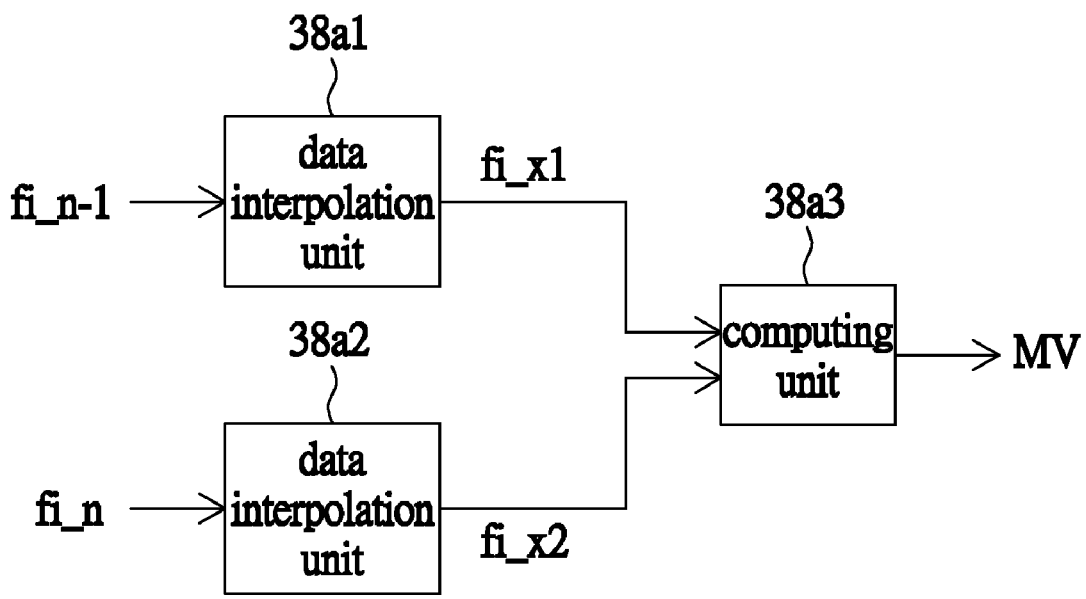
FIG. 7 is a detailed block diagram of the motion estimation unit in FIG. 6.

The motion estimation unit 38a may include data interpolation units 38a1 and 38a2, and a computing unit 38a3, as shown in FIG. 7. The data interpolation units 38a1 and 38a2 performs interpolation on the previous field fi_n-1 and the current field fi_n, respectively, to obtain complete frames fr_x1 and fr_x2, respectively. The computing unit 38a3 performs motion estimation according to the frames fr_x1 and fr_x2 to obtain the motion vector MV.

The motion compensation unit 38b performs motion compensation according to the motion vector MV, and next previous field $fi_{next\_}$n-2 and previous field $fi_{next\_}$n-1 of a next time cycle, to obtain a frame fr_b. Similar to the motion estimation unit 38a, the motion compensation unit 38b also has data interpolation units (not shown) for forming frames corresponding to the next previous field $fi_{next\_}$n-2 and previous field $fi_{next\_}$n-1 of the next time cycle, so as to obtain the frame fr_b by performing interpolation according to the interpolated frames and the motion vector MV.

The frame processing unit 39 is coupled to the de-interlacing unit 36 and the motion interpolation unit 38, and generates a frame fr_op for output according to the frames fr_a and fr_b. To be more exact, the frame processing unit 39 may be a frame selecting unit for selecting one frame from the frames fr_a and fr_b, or may be a frame mixing unit for executing blending algorithm according to the frames fr_a and fr_b to generate the fr_op for output.

Figure 8:
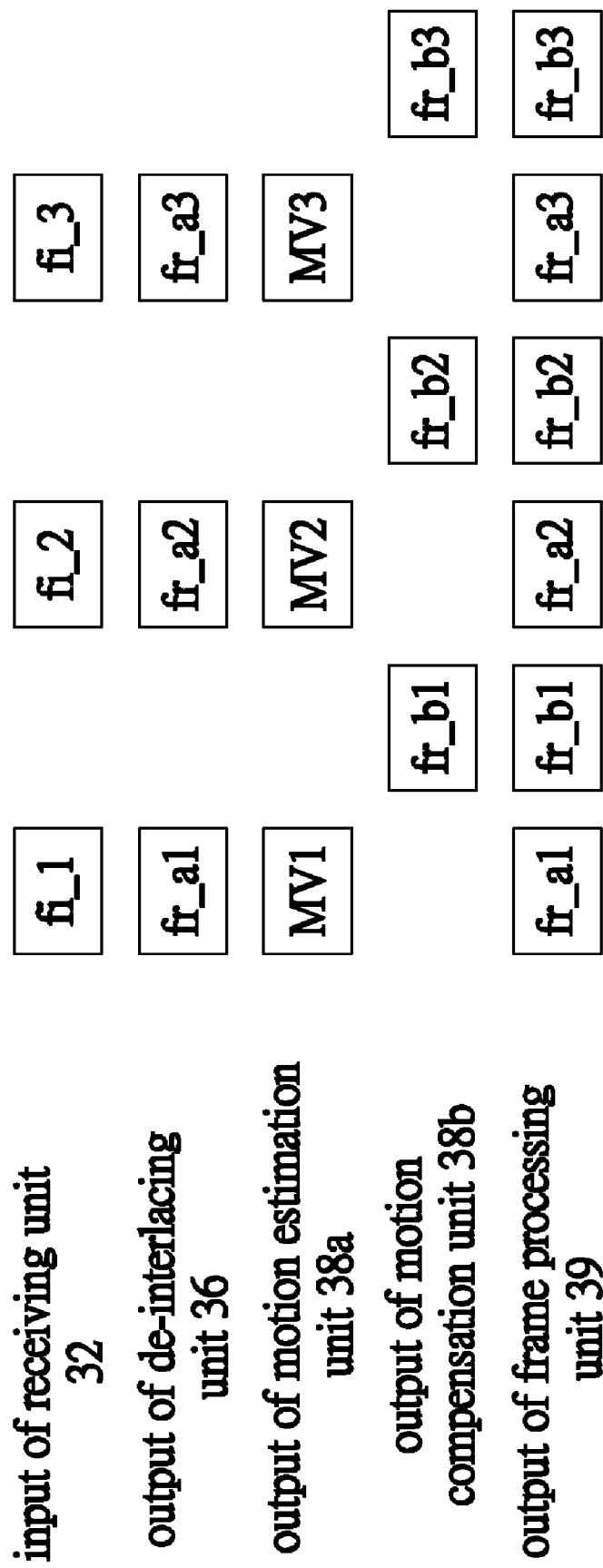
FIG. 8 is a TV image operation example of the image processing circuit according to the second embodiment of the invention.

A television image shall be used for further illustration of this embodiment with reference to FIG. 8 showing an operation example for TV images of the image processing circuit according to the second embodiment of the invention. Suppose television image data is transmitted to the receiving unit 32 at a rate of 60 fields per second, and the frame processing unit 39 generates 120 frames per second. In a current time cycle, the field fi_n received by the receiving unit 32 is the field fi_3. At the time, the fields fi_n-2, fi_n-1, and fi_n are fields fi_1, fi_2, and fi_3 respectively, wherein the fields fi_1 and fi_3 are even fields, and the field fi_2 is an odd field, for instance.

The de-interlacing unit 36 selects either the field fi_1 or the fi_3, or the mixed field mixed by the fields fi_1 and fi_3, and then generates a frame fr_a2 according to the field fi_2. The motion estimation unit 38a performs motion estimation according to the field fi_2 which is the present fi_n-1, and the field fi_3 which is the present fi_n, and generates a motion vector MV2.

In a next time cycle, the field fi_n received by the receiving unit 32 is a field fi_4 (not shown). At the time, the fields fi_n-2, fi_n-1, and fi_n are the fields fi_2, fi_3, and fi_4 respectively. The motion compensation unit 38b performs motion compensation according to the motion vector MV2, and the next previous field $fi_{next\_}$n-2 (fi_2) and previous field $fi_{next\_}$n-1 (fi_3) of the next time cycle to obtain a frame fr_b2.

An example of using the frame processing unit 39 as a frame selecting unit shall be given below. The frame processing unit 39 selects either the frame fr_a2 or the frame fr_b2 to be the frame fr_op for output. For instance, the frame processing unit 39 outputs the frames fr_a2 and fr_b2 in sequence. Hence, the rate of the output frame fr_op from the frame processing unit 39 is twice of the field fi_n received by the receiving unit 32, thus enabling a corresponding display to generate 120 frames per second.

Figure 9:
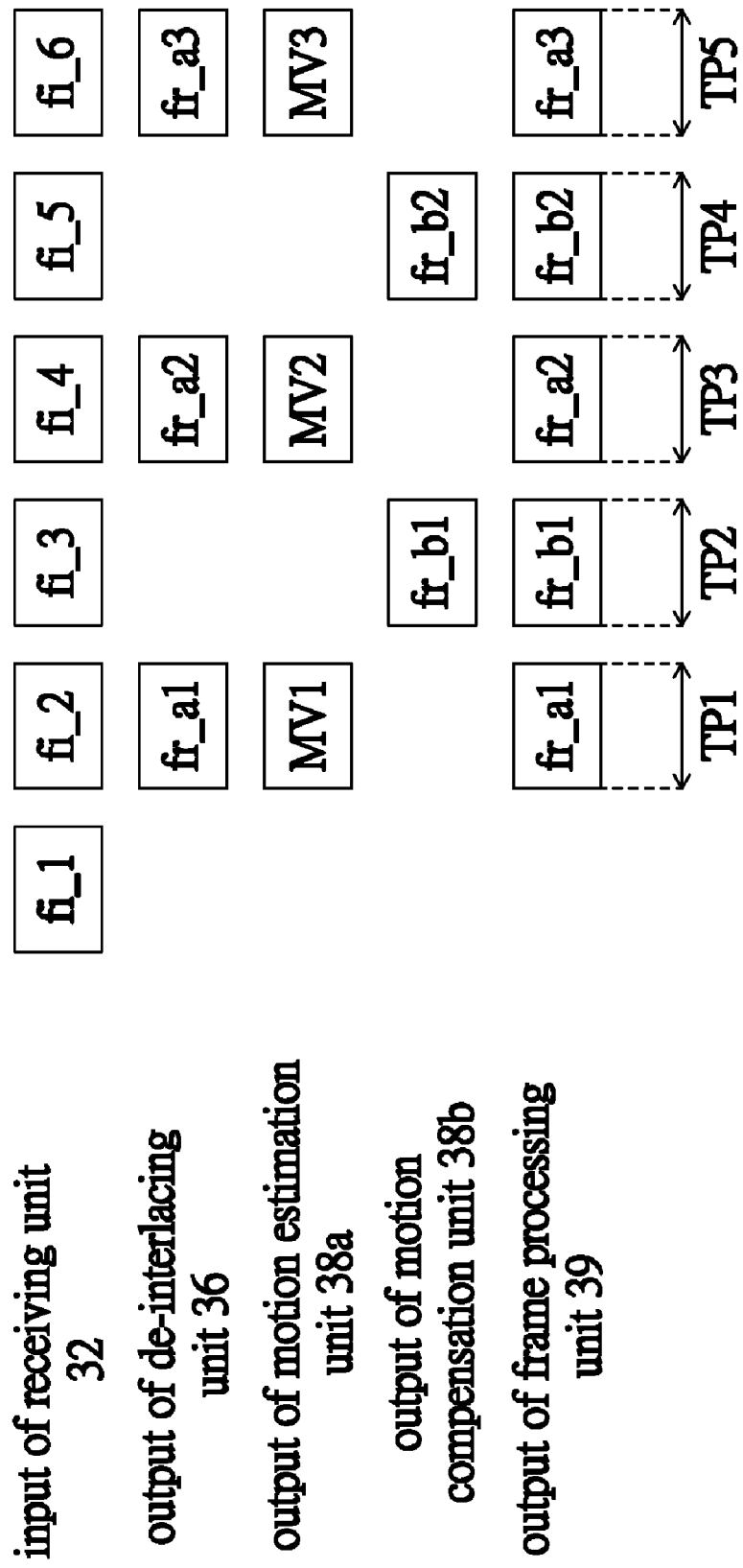
FIG. 9 is a movie image operation example of the image processing circuit according to the second embodiment of the invention.

A movie image shall be used for further illustration of this embodiment. Movie images are transmitted as 25 frames per second. FIG 9 is a an operation example for movie images of the image processing circuit according to the second embodiment of the invention. Fields fi_2 and fi_1 are odd and even fields coming from a frame and fields fi_4 and fi_3 correspond to odd and even fields of another frame, and so on.

During time periods TP1, TP3 and TP5, the de-interlacing unit 36 generates corresponding frames fr_a1, fr_a2 and fr_a3 by combining two fields corresponding to a same frame, respectively. For example, a frame fr_a1 is generated according to the fields fi_1 and fi_2. The motion estimation unit 38a generates corresponding MV1, MV2 and MV3, respectively. For example, the motion estimation 38a generates the motion vector MV1 according to the fields fi_2 and fi_3. Within the time periods TP2 and TP4, the motion compensation unit 38b generates corresponding fields fi_b1 and fi_b2 according to corresponding fields. For example, the motion compensation unit 38b generates the field fr_b1 according to the fields fi_2 and fi_3, and the motion vector MV1. In this embodiment, within the odd time periods TP1, TP3, and TP5, and the even time periods TP2 and TP4, the frame processing unit 39 selects the frame fr_a (e.g. fr_a1, fr_a2 and fr_a3) and fr_b (e.g. fr_b1 and fr_b2) as the output frame fr_op for output, respectively.

In the foregoing description, the frame processing unit 39 is used as a frame selecting unit. However, the frame processing unit 39 may also be a frame blending unit, which executes blending algorithm according to certain weights for adding fr_a and fr_b to obtain the frame fr_op.

Figure 10:
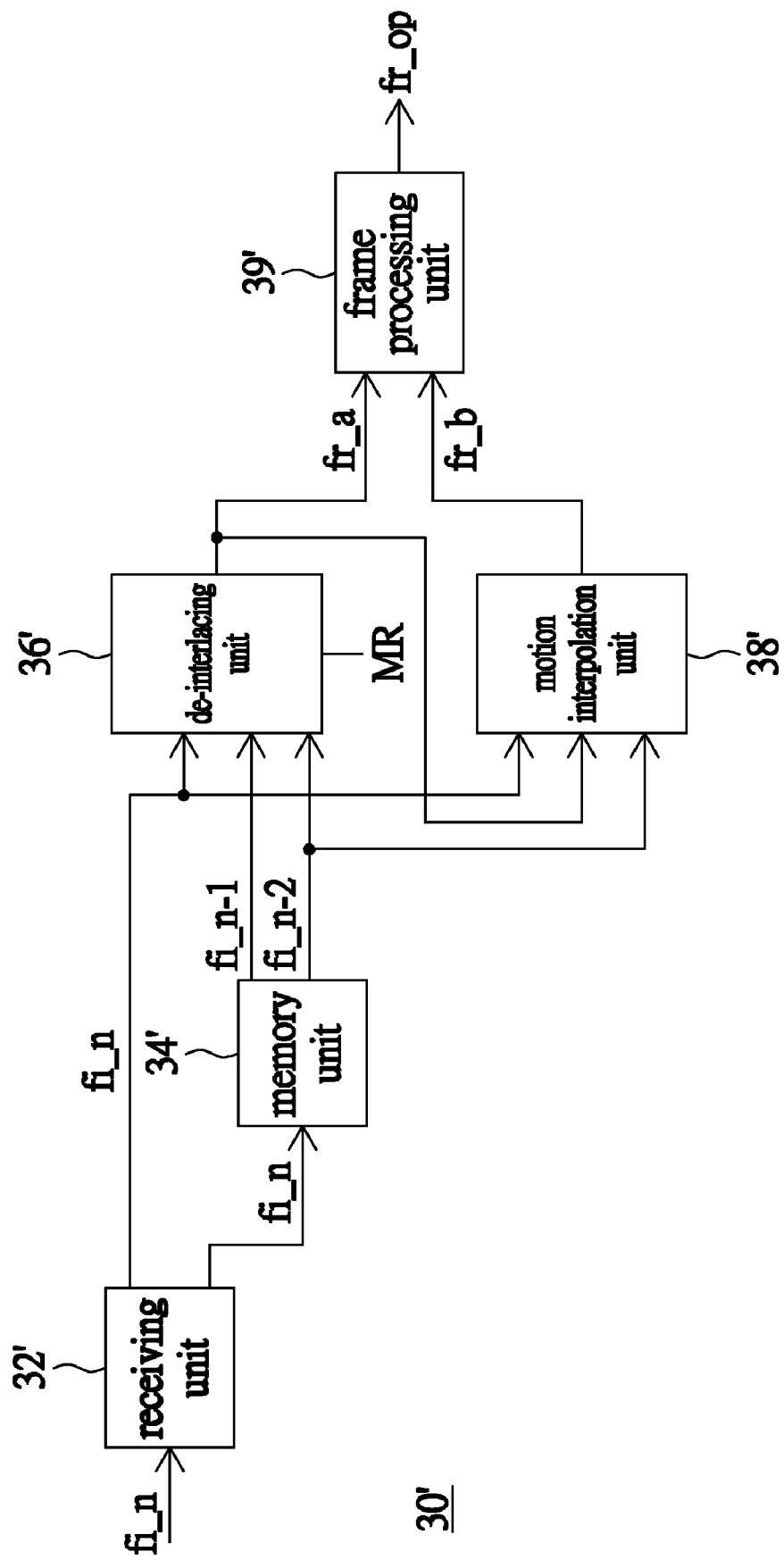
FIG. 10 is another block diagram of an image processing circuit according to the second embodiment of the invention.
Figure 11:
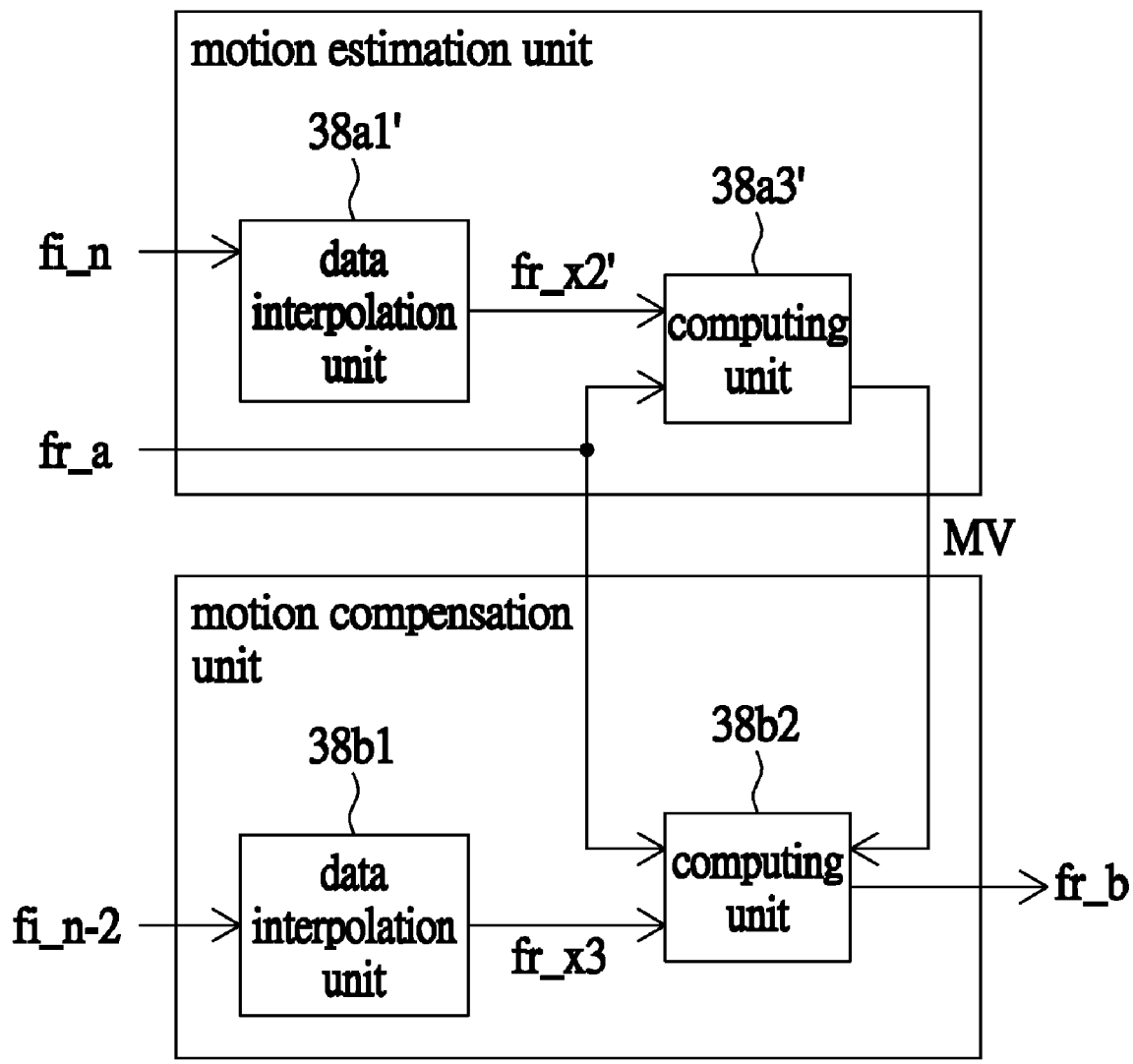
FIG. 11 is a block diagram of the motion interpolation unit in FIG. 10.

In this embodiment, the motion interpolation unit 38 performs interpolation according to the current, previous and next previous fields fi_n, fi_n-1, and fi_n-2 provided by the receiving unit 32 and the memory unit 34, and generates the frame fr_b accordingly. However, the motion interpolation unit 38 is not limited to the structure described. For instance, the motion interpolation unit 38 may also obtain the frame fr_b according to the frame fr_a generated by the de-interlacing unit 36, the current field fi_n and the next previous field fi_n-2, as shown in FIG. 10 illustrating another block diagram of the image processing circuit according to the second embodiment of the invention. Also refer to FIG. 11 showing a block diagram of an example of a motion interpolation unit 38' in FIG. 10.

A difference between the motion interpolation unit 38' in FIG. 10 and the motion interpolation unit 38 in FIG. 5 is that, the motion interpolation unit 38' includes a motion estimation unit 38a' and a motion compensation unit 38b'. Wherein, the motion estimation unit 38a' has a data interpolation unit 38a1' and an computing unit 38a3', and the motion compensation unit 38b' has a data interpolation unit 38b1 and an computing unit 38b2. The data interpolation units 38a1' and 38b1 perform interpolation according to the current field fi_n and the next previous field fi_n-2, respectively, and generate frames fr_x2' and fr_x3. The computing unit 38a3' performs motion estimation according to the frames fr_x2' and fr_a to obtain the motion vector MV. The computing unit 38b2 generates the frame fr_b according to the frames fr_x3 and fr_a.

In this embodiment, the de-interlacing unit 36' and the motion interpolation unit 38' perform operation according to the current, previous and next previous fields from the receiving unit 32' and the memory unit 34' to obtain the frames fr_a and fr_b. Hence, according to this embodiment, the de-interlacing unit 36' and the motion interpolation unit 38' of the image processing circuit 30' share a storage resource provided by the memory unit 34', and carries out image processing on input frames. Similarly, the de-interlacing unit 36' and the motion interpolation unit 38' may share the memory unit 34'. In this embodiment, similar to the first embodiment, the memory unit may be a field/frame buffer in an SRAM integrated in the image processing circuit, or may be in an external DRAM coupled to the image processing circuit. Compared to conventional image processing circuits, the image processing circuit according to this embodiment requires a memory with a small capacity and thus lower costs as well as lower transmission bandwidth as advantages thereof.

Third Embodiment

Figure 12:
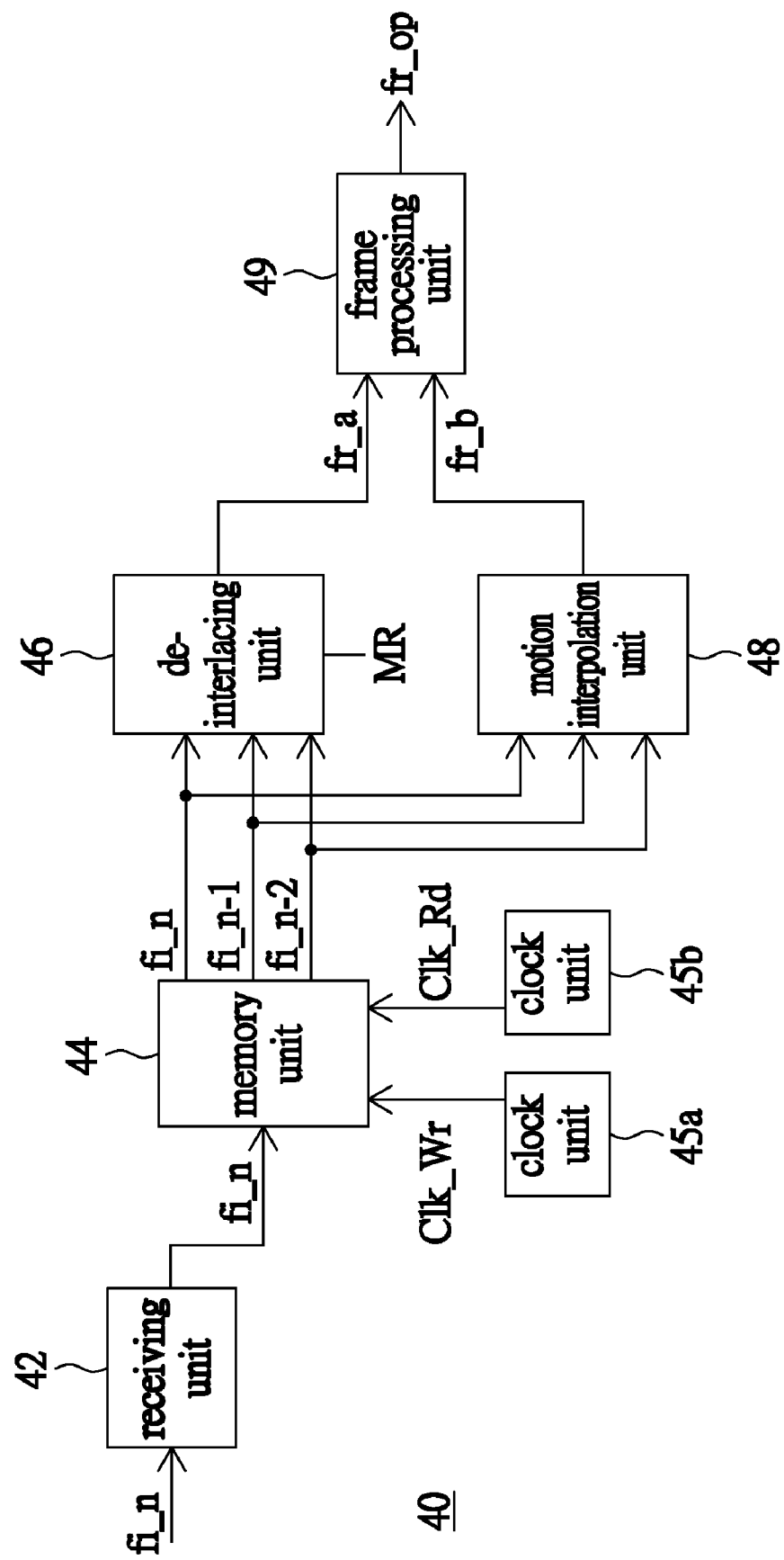
FIG. 12 is block diagram of an image processing circuit according to a third embodiment of the invention.

An image processing circuit according to this embodiment comprises a memory unit storing current, previous, and next previous fields, and performs de-interlacing and motion interpolation according to the three fields. Referring to FIG. 12 showing an image processing circuit according to the third embodiment of the invention, a difference between an image processing circuit 40 of this embodiment from the image processing circuit 30 of the second embodiment is that, a memory unit 44 of the image processing circuit 40 stores at least current, previous, and next previous fields. In addition, the image processing circuit 40 further comprises clock units 45a and 45b.

In the image processing unit 40, a receiving unit 42 receives a field fi_n. The memory unit 44 is coupled to the receiving unit 42 for storing at least stores three fields fi_n, fi_n-1, and fi_n-2. The clock generator 45a generates a clock clk_wr for writing the field data into the memory unit 44. The clock generator 45b generates a clock clk_rd for reading the field data from the memory unit 44. The de-interlacing unit 46 is coupled to the memory unit 44 for receiving the fields fi_n, fi_n-1, and fi_n-2 from the memory unit 44 to generate a frame fr_a accordingly. The rate of the clocks clk_wr and clk_rd may be different.

A motion interpolation unit 48 is coupled to the memory unit 44 for receiving the fields fi_n, fi_n-1, and fi_n-2 from the memory unit 44 to generate a frame fr_b accordingly. A frame processing unit 49 is coupled to the de-interlacing unit 46 and the motion interpolation unit 48 for selecting the frames fr_a or fr_b to be a frame fr_op as output image data for output.

Therefore, the image processing circuit 40 according to this embodiment only requires a storage resource of the memory unit 44 for storing the current, previous, and next previous fields fi_n, fi_n-1, and fi_n-2 in order to effectively generate the corresponding frame fr_op. Moreover, the image processing circuit 40 of this embodiment is not limited to the structure shown as the block diagram in FIG. 12, but may also be as the block diagram shown in FIG. 13.

Figure 13:
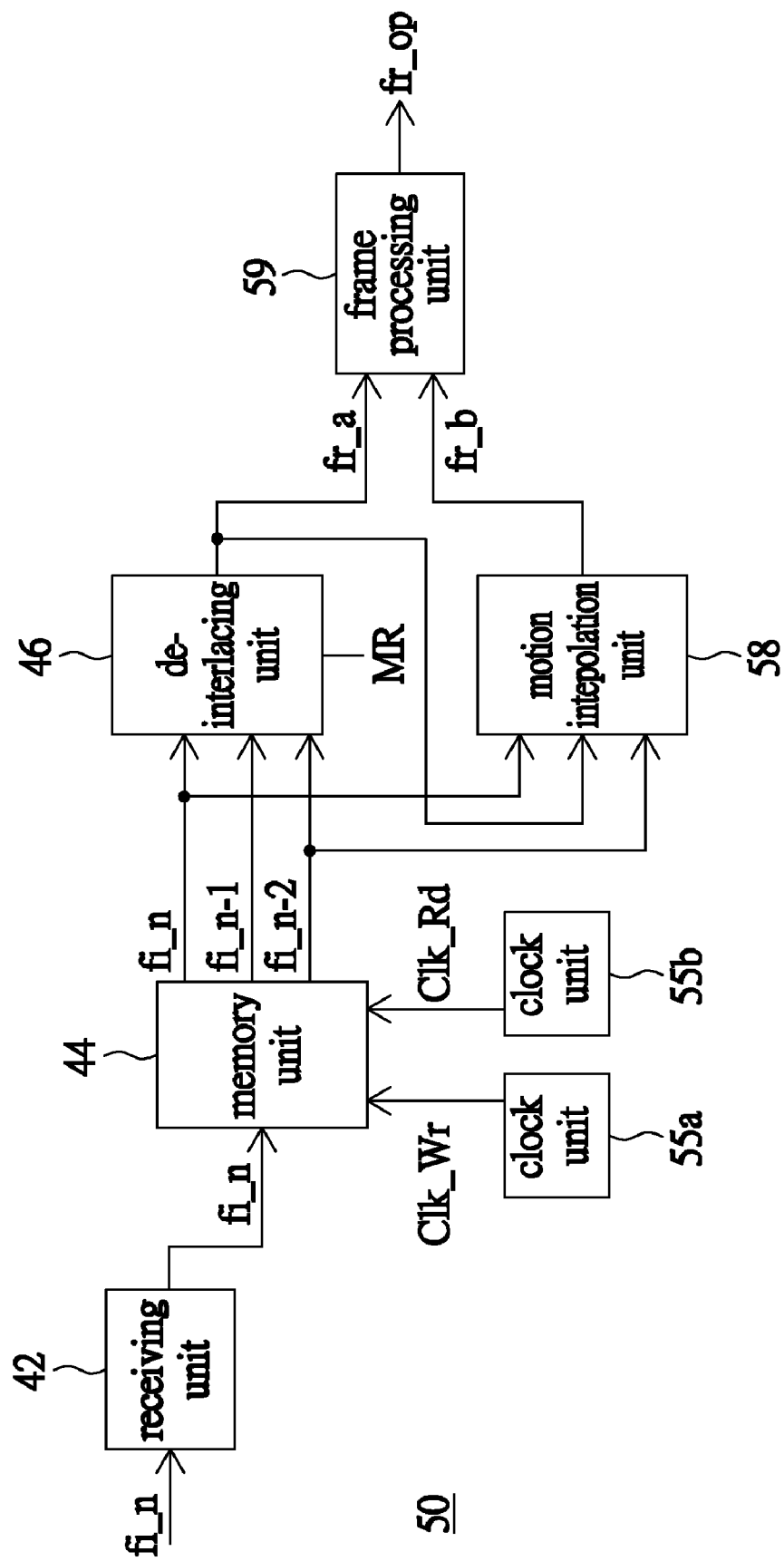
FIG. 13 is another block diagram of an image processing circuit according to the third embodiment of the invention.

A difference between the circuit in FIG. 13 and that in FIG. 12 is designs of a motion interpolation unit 58 and a frame processing unit 59. In FIG. 13, the motion interpolation unit 58 is coupled to the de-interlacing unit 46 for receiving the frame fr_a, coupled to the memory unit 44 for receiving the fields fi_n and fi_n-2, and generates the frame fr_b accordingly. The frame processing unit 59 is coupled to the de-interlacing unit 46 and the motion interpolation unit 58, and generates a frame according to the frames fr_a and fr_b to be an frame fr_op as output image data for output.

It is observed from the foregoing description that, in the image processing circuit according to this invention, the de-interlacing unit and the motion interpolation unit share a storage resource of the memory unit, and carry out image processing operations with regard to input image data. In this embodiment, like in the first embodiment, the memory unit may be a field/frame buffer in an SRAM integrated in the image processing circuit, or may be in an external DRAM coupled to the image processing circuit. Compared to conventional image processing circuits, the image processing circuit according to this embodiment requires a memory with a small capacity and thus lower costs as well as lower transmission bandwidth as advantages thereof.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An image processing circuit for generating an output frame according to a first field, a second field, and a third field in time sequence, comprising:
   a memory unit for storing the first field and the second field;
   a de-interlacing unit for receiving the third field and reading the first field and the second field from the memory unit to generate a de-interlaced frame;
   a motion interpolation unit for generating an interpolated frame according to the first field, the second field, and the third field; and
   a frame processing unit for generating the output frame according to the de-interlaced frame and the interpolated frame.

2. The image processing circuit as claimed in claim 1, wherein the first field, the second field, and the third field are a next previous field, a previous field, and a current field, respectively.

3. The image processing circuit as claimed in claim 2, wherein the memory unit having the same clock rate for reading and writing.

4. The image processing circuit as claimed in claim 2, wherein the de-interlacing unit comprises:
   a multiplexer for selecting one of the third field and the first field for outputting a selected field according to image contents; and
   a motion adaptive de-interlacing (MADi) circuit for generating the frame according to the selected field and the second field.

5. The image processing circuit as claimed in claim 4, further comprising:
   a motion ratio generating unit for generating a motion ratio according to the third field and the first field;
   wherein the motion adaptive de-interlacing (MADi) circuit generates the de-interlaced frame further according to the motion ratio.

6. The image processing circuit as claimed in claim 1, wherein the motion interpolation unit comprises:
   a motion estimation unit for performing motion estimation according to the second field and the third field to generate at least one motion vector; and
   a motion compensation unit for performing motion compensation on the first field and the second field according to the at least one motion vector to generate the interpolated frame.

7. The image processing circuit as claimed in claim 6, wherein the frame processing unit is a selecting unit for selecting one of the de-interlaced frame or the interpolated frame to be the output frame.

8. The image processing circuit as claimed in claim 6, wherein the frame processing unit is a blending unit for performing a blending algorithm on the de-interlaced frame and the interpolated frame to generate the output frame.

9. An image processing circuit for generating an output frame according to a first field, a second field, and a third field in time sequence, comprising:
   a memory unit for storing the first field and the second field;
   a de-interlacing unit for receiving the third field and reading the first field and the second field from the memory unit to generate a de-interlaced frame;
   a motion interpolation unit for generating an interpolated frame according to the first field, the third field, and the de-interlaced frame; and
   a frame processing unit for generating the output frame according to the de-Interlaced frame and the interpolated frame.

10. An image processing circuit for generating an output frame, comprising:
    a memory unit for storing a first field, a second field, and a third field in time sequence;
    a de-interlacing unit for generating a de-interlaced frame according to the first field, the second field, and the third field;
    a motion interpolation unit for generating an interpolated frame according the first field, the second field, and the third field; and
    a frame processing unit for generating the output frame according to the de-Interlaced and the interpolated frame.

11. The image processing circuit as claimed in claim 10, further comprising:
    a first clock unit for providing a first clock rate for writing data to the memory unit; and
    a second clock unit for providing a second clock rate for reading the data from the memory unit;
    wherein the first clock rate and the second clock rate are different.

12. The image processing circuit as claimed in claim 10, wherein the frame processing unit is a selecting unit for selecting one of the de-interlaced frame or the interpolated frame to be the output frame.

13. The image processing circuit as claimed in claim 10, wherein the frame processing unit is a blending unit for performing a blending algorithm on the de-interlaced frame and the interpolated frame to generate the output frame.

14. An image processing circuit for generating a frame according to a plurality of fields, comprising:
    a memory unit for storing a first field, a second field, and a third field in time sequence;
    a de-interlacing unit for generating a de-interlaced frame according to the first field, the second field, and the third field;
    a motion interpolation unit for generating a interpolated frame according to the de-interlaced frame, the first field, and the third field; and
    a frame processing unit for generating the output frame according to the de-Interlaced and the interpolated frame.

15. An image processing method for generating an output frame according to a first field, a second field, and a third field in time sequence, wherein the first field and the second field are stored in a memory, the method comprising steps of:
    receiving the third field and reading the first field and the second field from the memory;
    selecting one of the first field and the third field to be a selected field;
    generating a de-interlaced frame by de-interlacing the second field and the selected field;
    performing motion interpolation to generate an interpolated frame according to the first field, the second field, and the third field; and
    generating the output frame according to the de-interlaced frame and the interpolated frame.

16. The image processing method as claimed in claim 15, wherein the step of performing motion interpolation further comprising steps of:
    performing motion estimation according to the second field and the third field to generate at least one motion vector; and
    performing motion compensation on the first field and the second field according to the at least one motion vector to generate the interpolated frame.

17. A de-interlacing circuit, coupled to a memory, for generating a de-Interlaced frame according to a first field, a second field, and a third field in time sequence, wherein the first field and the second field are stored in the memory, comprising:
- a selector for selecting one of the first field and the third field to be a selected field based on image contents; and
- a motion adaptive de-interlacing (MADi) circuit for generating the de-interlaced frame according to the second field and the selected field.

18. The de-interlacing circuit as claimed in claim 17, further comprising a motion ratio generating unit for generating a motion ratio according to the third field and the first field; wherein the motion adaptive de-interlacing (MADi) circuit generates the de-interlaced frame according to the motion ratio.

19. An image processing circuit coupled to a memory for generating an output frame according to a first field, a second field, and a third field in time sequence, wherein at least the first field and the second field are stored in the memory, comprising:
- a de-interlacing unit for generating a de-interlaced frame according to the first field, the second field, and the third field;
- a motion interpolation unit for generating an interpolated frame according to the first field, the second field, and the third field; and
- a frame processing unit for generating the output frame according to the de-interlaced frame and the interpolated frame.

20. The image processing circuit as claimed in claim 19, wherein the motion interpolation unit comprises:
- a motion estimation unit for performing motion estimation according to the second field and the third field to generate at least one motion vector; and
- a motion compensation unit for performing motion compensation on the first field and the second field according to the at least one motion vector to generate the interpolated frame.

21. The image processing circuit as claimed in claim 19, wherein the frame processing unit is a selecting unit for selecting one of the de-interlaced frame or the interpolated frame to be the output frame.

22. The image processing circuit as claimed in claim 19, wherein the frame processing unit is a blending unit for performing a blending algorithm on the de-interlaced frame and the interpolated frame to generate the output frame.

23. An image processing circuit coupled to a memory for generating an output frame according to a first field, a second field, and a third field in time sequence, wherein at least the first field and the second field are stored in the memory, comprising:
- a de-interlacing unit for generating a de-interlaced frame according to the first field, the second field, and the third field;
- a motion interpolation unit for generating an interpolated frame according to the first field, the third field, and the de-interlaced frame; and
- a frame processing unit for generating the output frame according to the de-interlaced frame and the interpolated frame.

24. The image processing circuit as claimed in claim 23, wherein the motion interpolation unit comprises:
- a motion estimation unit for performing motion estimation according to the second field and the third field to generate at least one motion vector; and
- a motion compensation unit for performing motion compensation on the first field and the de-interlaced frame according to the at least one motion vector to generate the interpolated frame.

25. The image processing circuit as claimed in claim 23, wherein the frame processing unit is a selecting unit for selecting one of the de-interlaced frame and the interpolated frame to be the output frame.

26. The image processing circuit as claimed in claim 23, wherein the frame processing unit is a blending unit for performing a blending algorithm on the de-interlaced frame and the interpolated frame to generate the output frame.

* * * * *